United States Patent
Yadav et al.

(10) Patent No.: US 11,874,749 B1
(45) Date of Patent: Jan. 16, 2024

(54) STREAMING SLICES OUT OF ORDER FOR EFFICIENT BACKUP

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/957,415

(22) Filed: Sep. 30, 2022

(51) Int. Cl.
    *G06F 16/10*     (2019.01)
    *G06F 11/14*     (2006.01)
    *G06F 16/11*     (2019.01)

(52) U.S. Cl.
    CPC ........ *G06F 11/1469* (2013.01); *G06F 16/122* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 2012/0159098 A1* | 6/2012 | Cheung | G06F 12/0261 |
| | | | 711/170 |
| 2017/0090773 A1* | 3/2017 | Vijayan | G06F 11/00 |
| 2020/0349317 A1* | 11/2020 | Upadhyay | G06F 40/289 |
| 2021/0303511 A1* | 9/2021 | Karr | G06F 16/1824 |
| 2021/0303522 A1* | 9/2021 | Periyagaram | G06F 16/178 |
| 2022/0050858 A1* | 2/2022 | Karr | G06F 16/1748 |
| 2022/0121880 A1* | 4/2022 | Buniatyan | G06F 16/258 |

\* cited by examiner

*Primary Examiner* — Jau Shya Meng
(74) *Attorney, Agent, or Firm* — Aly Z. Dossa

(57) ABSTRACT

Embodiments of the invention relate to methods and systems for efficiently backing up and restoring assets such as files and folders in the form of slices and streams. In one or more embodiments, assets such as files and folders that are to be backed up are placed in appropriate network slice queues, which are then assigned to network streams. The slices/assets are assigned in such a way that each stream has a similar cost and throughput. The backup is performed, and the streams are stored in their own backup containers until a restoration is needed. Once a restoration is needed, the meta-data for the backup is used to restore the files and folders, forming the asset back to their appropriate locations in the target file-system. This results in efficient use of network resources, while minimizing the amount of work the hosts and/or clients must perform during a backup or restoration.

20 Claims, 5 Drawing Sheets

STREAMING SLICES OUT OF ORDER FOR EFFICIENT BACKUP

BACKGROUND

As people increasingly rely on computing systems and devices to perform a plethora of tasks; the systems have become increasingly complex, and the opportunities for failure and/or loss of important data has also increased. In order to avoid loss of important data, backups are performed on the computing systems and devices, so that when device failures or loss of data for other reasons occur, the lost data may be restored. However, traditional methods of backing up and restoring data is inefficient, slow, and uses much of the available network bandwidth.

SUMMARY

In general, certain embodiments described herein relate to a method for performing a backup. The method comprises of receiving a request for a backup of an asset associated with a production host. The asset comprises files and folders stored in the file-system of the production host. Once a request for performing a backup is received, the method retrieves network statistics for a plurality of streams and determines based on the network statistics, peak throughput for the plurality of streams. The method also retrieves meta-data for the assets and slices the asset into a plurality of slices. The asset in the form of slices is then assigned to one of the plurality of streams in such a way that each stream of the plurality of streams has a similar throughput based on the peak throughput for each of the plurality of streams. The backup is then performed and each of the plurality of streams are stored to its own backup container, which includes meta-data that maps each file and folder of the asset to the backup container and to its original location in the file-system of the production host.

In general, certain embodiments described herein relate to a non-transitory computer readable medium comprising computer readable program code, which when executed by a computer processor enables the computer processor to perform a method for performing a backup. The method comprises of receiving a request for a backup of an asset associated with a production host. The asset comprises files and folders stored in the file-system of the production host. Once a request for performing a backup is received the method retrieves network statistics for a plurality of streams and determines based on the network statistics, peak throughput for the plurality of streams. The method also retrieves meta-data for the assets and slices the asset into a plurality of slices. The asset in the form of slices is then assigned to one of the plurality of streams in such a way that each stream of the plurality of streams has a similar throughput based on the peak throughput for each of the plurality of streams. The backup is then performed and each of the plurality of streams are stored to its own backup container, which includes meta-data that maps each file and folder of the asset to the backup container and to its original location in the file-system of the production host.

In general, certain embodiments described herein relate to a system comprising: a production host that includes, a processor, and a memory. The memory includes instructions, which when executed by the processor, perform a method for performing a backup. The method comprises of receiving a request for a backup of an asset associated with the production host. The asset comprises files and folders stored in the file-system of the production host. Once a request for performing a backup is received, the method retrieves network statistics for a plurality of streams and determines based on the network statistics, peak throughput for the plurality of streams. The method also retrieves meta-data for the assets and slices the asset into a plurality of slices. The asset in the form of slices is then assigned to one of the plurality of streams in such a way that each stream of the plurality of streams has a similar throughput based on the peak throughput for each of the plurality of streams. The backup is then performed and each of the plurality of streams are stored to its own backup container, which includes meta-data that maps each file and folder of the asset to the backup container and to its original location in the file-system of the production host.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
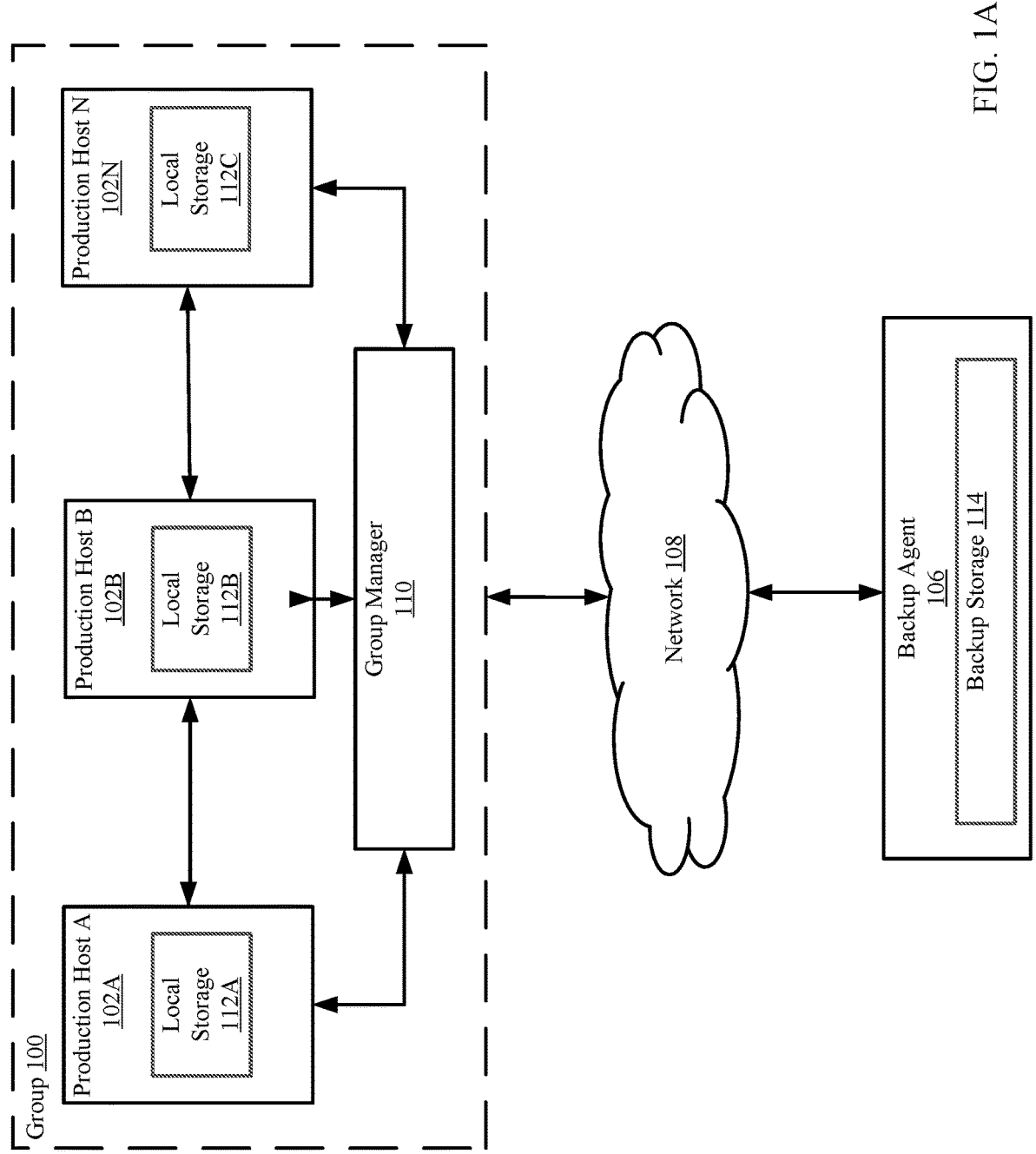
FIG. 1A shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any descriptions of the components of a figure are to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or preceded) the second element in an ordering of elements.

As used herein, the phrase "operatively connected", or "operative connection", means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In many traditional data protection and management solutions for client/server architectures, there are multiple clients/proxies and other network connected systems which retrieve assets comprising of related files and/or folders from hosts located on the servers. Clients send a request for a desired asset on the host and then each client crawls the files and/or folders over the network to get a list of files and folders located on the host(s) that are associated with the desired asset. The files and folders that the client wants to access, such as for performing a backup, are grouped together by the client, and sliced to form manageable slices of the asset which are assigned to a plurality of network streams. However, in traditional solutions, there is no underlying intelligence that seeks to balance the computational cost of forming the streams and their throughput. This lack of intelligence results in slices and streams that vary in size, cost, and throughput by relatively large percentages. This results in the transfer of the asset being inefficient and taking up more network capacity then ideally needed.

In accordance with one or more embodiments, this process is made more efficient by having the assets, including its associated files and folders, which are to be backed up, sorted, divided, and placed in appropriate network slices and streams in such a way that each stream has a similar cost and throughput (within a predetermined tolerance). In accordance with one or more embodiments, meta-data for the asset/file-system and network statistics are leveraged to determine how to slice and stream each file and folder in the most efficient way and not necessarily in the same order that the files and folders are stored in the file-system.

Further, in accordance with one or more embodiments, once the backup is performed, the streams are stored in their own backup containers until a restoration is needed. By utilizing the containers, re-ordering of the files after the backup is performed is no-longer needed. This reduces the number of operations required during a backup. Once a restoration is needed, the meta-data for the backup is used to restore the files and folders forming the asset back to their appropriate locations in the target file-system.

The one or more embodiments of the invention, utilize meta-data to ensure that a backup is efficiently transmitted stored and restored. This ensures efficient use of network resources and predictable transfer speeds. This also minimizes the amount of work the host(s) and/or target computer systems such as clients must perform in order to share or transfer an asset.

The following describes various embodiments of the invention.

FIG. 1A shows a diagram of a system in accordance with one or more embodiments of the invention. The system includes a group (100) that includes a plurality of hosts (e.g., 102A-102N) and a group manager (110). The system may include any number of hosts (e.g., 102A-102N) and groups (e.g., 100) without departing from the invention. For example, the system may include six hosts configured as two groups (not shown) that communicate through a network (108). The system also includes a backup agent (106) which may perform backups of assets located on any of the production hosts (e.g., 102A-102N). The system may include additional, fewer, and/or other components without departing from the invention. Each of the components in the system may be operatively connected via any combination of wireless and/or wired networks (108). Each component illustrated in FIG. 1A is discussed below.

In one or more embodiments of the invention, the group (100) interacts via a network (108) with one or more backup agents (e.g., 106). The backup agent (106) may be a separate computing system that coordinates backups and restorations and includes, in one or more embodiments of the invention, storage (e.g., 114) for storing a completed backup and other data. Alternatively, or in addition to, in one or more embodiments of the invention, the backup agents may be parts of the group manager (e.g., 110) or one or more production hosts (e.g., 102A-102N). Other configurations of the backup agents (e.g., 106) and the group (e.g., 100) may be utilized without departing from the invention.

In one or more embodiments of the invention, the backup agent (106) may generate and provide to the backup storage device (114) the backups and the historical meta-data based on backup policies implemented by the backup agent (106). The backup policies may specify a schedule in which assets associated with the production hosts (e.g., 102A-102N) are to be backed up. The backup agent (106) may be triggered to generate a backup along with backup meta-data and provide the backup and its meta-data to the backup storage device (114) in response to a backup policy. Alternatively, backup, and backup meta-data may be generated by the backup agent (106) and provided to the backup storage device (114) in response to a backup request triggered by a client (not-shown) or user of the system. The method of backing up an asset comprising of files and folders is described in more detail below with regards to the method shown in FIG. 2.

In one or more embodiments of the invention, the backup agent (106) may restore the backup meta-data and backup data stored in the backup storage (114). When the backup agent or other equivalent component of the system, receives a request for a restoration of a backup, the backup agent (e.g., 106) or equivalent component, retrieves the meta-data and data stored in the backup storage (e.g., 114) and restores the data to its original location in the production hosts (e.g., 102A-102N). Alternatively, in one or more embodiments of the invention, the data in the backup may be restored to a file-system located in a different production host than where it was originally restored as directed by a user, administrator, or other party that requested the restoration. The method of restoring the backup is described in more detail below with regards to the method shown in FIG. 3.

In one or more embodiments of the invention, the backup agent (106) may periodically or in response to receiving a request for a backup, perform a meta-data-based backup (MBB) of one or more file systems associated with the production hosts (e.g., 102A-102N). When performing an MBB, the backup agent (106) or equivalent component of the system, gathers the meta-data for all the files and folders of the file-systems associated with the production hosts (e.g., 102A-102N). This meta-data is then saved to each of the local storages (e.g., 112A-112N) of the production hosts (e.g., 102A-102N) for use in future backups as well as for other functions. Alternatively, the meta-data gathered during the MBB may be stored in backup storage (116) or in the group manager (110) or other storage that is part of the group (e.g., 100) or connected to the group (e.g., 100) via the network (e.g., 108).

In one or more embodiments of the invention, the backup agent (106) includes its own storage (114). The backup storage (114) may store data and/or files such as backup data, meta-data, as well as definitions rules, procedures, and other pertinent information for performing backups of the production hosts (e.g., 102A-102N). The backup agent's storage (114) may include one or more processors, memory (e.g., random access memory), and persistent storage (e.g., disk drives, solid state drives, etc.). In one or more embodiments of the invention, the backup agent's storage (114), as well as the backup agent (106) itself, may also, or alternatively, comprise of off-site storage including but not limited to, cloud base storage, and long-term storage such as tape drives, depending on the particular needs of the user and/or the system.

In one or more embodiments of the invention, the backup agent (106) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (106) described throughout this application.

Figure 4:
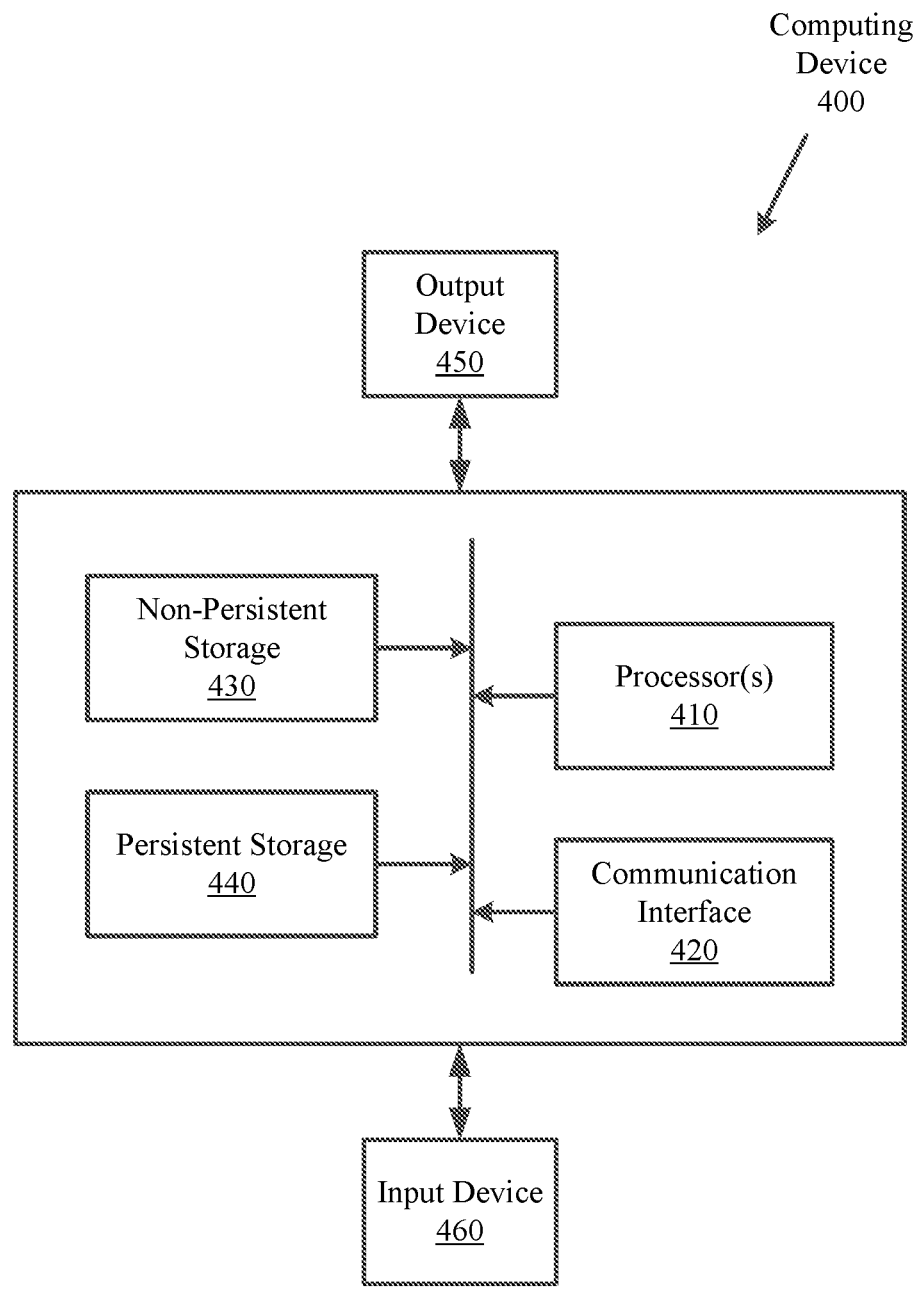
FIG. 4 shows a diagram of a computing device in accordance with one or more embodiments of the invention.

In one or more embodiments of the invention, the backup agent (106) is implemented as a computing device (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup agent (e.g., 106) described throughout this application.

In one or more embodiments of the invention, the backup agent (106) is implemented as computer instructions, e.g., computer code, stored in a persistent storage that when executed by a processor of the production hosts (e.g., 102A-102N) causes the production hosts (e.g., 102A-102N) to provide the functionality of the backup agents (106) described throughout this application. Alternatively, in one or more embodiments of the invention, the backup agent (106) may be implemented by the group manager (e.g., 110), a client (not shown), or other component of the system, which may provide the functionality of the backup agent (106) described throughout this application.

In one or more embodiments of the invention, the group (100) of hosts (e.g., 102A-102N), group manager (110), and the backup agent (106) communicate through a network (108). The network (108) may take any form including any combination of wireless and/or wired networks. The network (108) may be a local network (LAN) or a wide area network (WLAN) including the Internet or a private enterprise network that connects more than one location. The network (108) may be any combination of the above networks, other known network, or any combination of network types.

In one or more embodiments of the invention, the network (108) allows the group (100) to communicate with other groups (not shown) and external computing devices such as, but not limited to, a client and/or a backup agent (e.g., 106). The various components of the group (100) may also communicate with each other through a network. The network may be a high-speed internal network and/or include part of an external network (e.g., 108). The production hosts (e.g., 102A-102N), and group manager (e.g., 110) communicate with each other over the internal network and in one or more embodiments of the invention provide fallback functionality.

A network (e.g., 108) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location or be distributed at any number of physical sites. In one or more embodiments, a network may be coupled with, or overlap, at least in part, with the Internet.

In one or more embodiments, although shown separately in FIG. 1A, the network (108) may include any number of devices within any components (e.g., 100, 102A-102N, 106, and 110) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown). A network device may also include one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

In one or more embodiments of the invention, the network (e.g., 108) utilizes one or more streams for communicating (or transferring) information between two components such as between the production hosts (e.g., 102A-102N) and the backup agent (e.g., 106). Any particular communication may have one or more streams assigned to it, with a maximum number of streams being preconfigured as a consequence of the network's design. Each stream has a maximum throughput, which is the maximum amount of data that may be sent between two components during a period of time given network conditions. The total number of streams that may be used is dependent on the capabilities of the network and components as well as the total throughput. Each stream utilizes part of the total bandwidth, thus when more streams are applied, each stream has a lower total throughput.

Once the backup is initialized, the maximum throughput of each of the plurality of streams is determined by obtaining network telemetry or by other means specific to the specific network configuration. Once the maximum throughput as well as the number of available streams is determined at least one of the assets located on the production hosts (e.g., 102A-102N) may be backed up in accordance with the method described in more detail with regards to the method shown in FIG. 2.

In one or more embodiments of the invention, a group (e.g., 100) may be implemented as one or more computing devices. A group (e.g., 100) may include any number of computing devices without departing from the invention. The group may include different computing devices, different quantity, and types of computer resources, and may perform different computer implemented services without departing from the invention.

In one or more embodiments of the invention, the group (100) includes a plurality of production hosts (e.g., 102A-102N) which include the functionality to obtain data protection services from a data protection manager (not shown), the backup agent (e.g., 106) and/or the group manager (e.g., 110). While shown as containing only three production hosts (e.g., 102A-102N), the group (100) may include more or less production hosts without departing from the invention. For example, a group (e.g., 100) may include at least sixteen production hosts, at least fifty production hosts, or at least a hundred production hosts without departing from the invention.

Each host (e.g., 102A-102N) includes local storage (e.g., 112A-112N) for storing assets such as files and folders which may be made available to other hosts or requesting target devices such as the backup agent (e.g., 106). The local storage (e.g., 112A-112N) may include one or more processors, memory (e.g., random access memory), and persistent storage (e.g., disk drives, solid state drives, etc.). In one or more embodiments of the invention, the local storage (e.g., 112A-112N) may contain off-site storage including, but not limited to, cloud base storage and long-term storage such as tape drives, depending on the particular needs of the user and/or the system. The group may also contain shared storage including at least one group shared volume (CSV) (not shown) which is active with each of the production hosts (e.g., 102A-102N) of the group (100). Other types of shared storage may also or alternatively be included such as active-passive storage and local storage (e.g., 112A-112N).

In one or more embodiments of the invention, the production hosts (e.g., 102A-102N) perform workloads and provide services to clients and/or other entities not shown in the system illustrated in FIG. 1A. The production hosts (e.g., 102A-102N) may further include the functionality to perform computer implemented services for users (e.g., clients) of the group (100). The computer implemented services may include, for example, database services, electronic mail services, data processing services, etc. The computer implemented services may include other and/or additional types of services without departing from the invention.

During the performance of the aforementioned services, data may be generated and/or otherwise may be obtained. The production hosts (e.g., 102A-102N) include local storage (e.g., 112A-112N) which may include multiple volumes, as well as shared storage which may include group shared volumes (e.g., CSVs). The various data storage volumes (e.g., 112A-112N) performing data storage services may include storing, modifying, obtaining, and/or deleting data. The data storage services may include other additional services without departing from the invention. The data generated and stored on the local storage (e.g., 112A-112N) by the production hosts (e.g., 102A-102N) may be valuable to users of the system, and therefore may be protected by the backup agent (e.g., 106). The production hosts (e.g., 102A-102N), alternatively or in addition to the backup agent (e.g., 106) may provide backup storage services and include backup storage on the local storage (e.g., 112A-112N). The backup storage services may include storing backups of data stored on the shared storages for restoration purposes. The backup storage services may include other and/or additional services without departing from the invention.

The production hosts (e.g., 102A-102N) may include a primary production host (e.g., 102A) and secondary production hosts (e.g., 102B and 102N). The specific configuration of which production host is the primary production host and which production host is the secondary production host may be preconfigured or may be automatically managed by the group manager (e.g., 110). The production hosts (e.g., 102A-102N) may include any number of secondary production hosts without departing from the invention. Alternatively, all production hosts (e.g., 102A-102N) may be secondary production hosts with the group manager (e.g., 110) performing the additional tasks of the primary host.

The production hosts (e.g., 102A-102N), may be operably connected to one or more group shared storages and may obtain data storage services from the one or more group shared storages. The production hosts (e.g., 102A-102N) may be operably connected to each other, and each production host (e.g., 102A) may include the ability to use all or part of the volumes, including shared active-passive drives that form the local storage (e.g., 112A-112N) of the other production hosts (e.g., 102B and 102C).

In one or more embodiments of the invention, the production hosts (e.g., 102A-102N) are implemented as computing devices (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (e.g., 102A-102N) described throughout this application.

In one or more embodiments of the invention, the production hosts (e.g., 102A-102N) are implemented as logical devices. The logical devices may utilize the computing resources of any number of computing devices and thereby provide the functionality of the production hosts (e.g., 102A-102N) described throughout this application.

The production hosts (e.g., 102A-102N) as well as other components of the group and connected devices may perform data storage services. The data storage services may include storing, modifying, obtaining, and/or deleting data stored on the local and shared storages (e.g., 112A-112N) based on instructions and/or data obtained from the production hosts (e.g., 102A-102N) or other components of the group (e.g., 100). The data storage services may include other and/or additional services without departing from the invention. The local storages (e.g., 112A-112N) may include any number of storage volumes without departing from the invention. The storage volumes may be physical storage devices and/or logical storage devices. The physical storage devices may include any combination of hard disk drives, solid state disk drives, tape drives, and/or any other physical storage mediums for data.

The logical storage devices may utilize any quantity of hardware storage resources of any number of computing devices for storing data. For example, the local and shared storages (e.g., 112A-112N) may utilize portions of any combination of hard disk drives, solid state disk drives, tape drives, and/or any other physical storage mediums for any number of computing devices.

In one or more embodiments of the invention, the production hosts (e.g., 102A-102N) as well as the associated local storages (e.g., 112A-112N) are managed by a group manager (e.g., 110). The group manager (110) performs a plurality of functions not limited to managing and configuring the services provided by the production hosts (e.g., 102A-102N), managing the mapping and movement of data on the local storage devices (e.g., 112A-112N). The group manager (110) may perform other function(s) attributed to other components of the system not described herein without departing from the invention.

In one or more embodiments of the invention the group manager (110) includes the functionality to perform a portion, or all of, the data protection services of the data protection manager (not shown). This may include performing discovery of the volumes and assets associated with the production hosts (e.g., 102A-102N) including those stored on the local storage (e.g., 112A-112N). This may also include performing or initiating backups and restorations as well as other functions of the backup agent (e.g., 106) including those of the method described below with regards to the methods shown in FIGS. 2 and 3. The group manager (110) may include the functionality to perform and or obtain other and/or additional services without departing from the invention.

In one or more embodiments of the invention, the group manager (110) may perform discovery on the volumes and assets comprising of files and folders associated with the production hosts (e.g., 102A-102N) including those stored on the local storage (e.g., 112A-112N). The group manager queries each production host (e.g., 102A-102N) and their associated local storage (e.g., 112A-112N). Using the results of the query, the group manager (110) produces a file and folder mapping, which is stored as file system meta-data on each of the production hosts (e.g., 102A-102N). This allows for each of the production hosts (e.g., 102A-102N) to know where a given file and/or folder is located at any given time. By updating the discovery periodically, such as, but not limited to, every fifteen seconds, the mapping may remain accurate and provide quicker access times with less or no inter-host messaging. Further, if one production host fails, the location of any shared assets is not lost.

In one or more embodiments of the invention, the group manager (110) in addition to, or instead of other components such as a data protection manager (not shown), a backup agent (e.g., 106) or a client (not shown), may determine the preferred production host for the performing of data protection such as a backup of given assets, files and folders related to a specific application or other user defined grouping of files and folders. This may be done during the periodic discovery, or as a result of a request for performing a backup or restoration as described in more detail in the methods shown in FIGS. 2 and 3, or at any other configured time as configured by a user, administrator, or system designer/manufacturer.

In one or more embodiments of the invention, a group manager (e.g., 110) is a physical device. The physical device may include circuitry. The physical device may be, for example, a field-programmable gate array, application specific integrated circuit, programmable processor, microcontroller, digital signal processor, or another hardware processor. The physical device may be adapted to provide the functionality of the group manager (e.g., 110) described throughout this application.

In one or more embodiments of the invention, the group manager (110) is implemented as computer instructions, e.g., computer code, stored on a persistent storage that when executed by a processor of the group (e.g., 100), including any one of the production hosts (e.g., 102A-102N) to provide the functionality of the group manager (e.g., 110) described throughout this application.

In one or more embodiments of the invention, the group manager (110) is implemented as a computing device (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the group manager (e.g., 110) described throughout this application.

In one or more embodiments of the invention, the group manager (110) is implemented as a logical device. The logical device may utilize the computing resources of any number of computing devices and thereby provide the functionality of the group manager (e.g., 110) described throughout this application.

In one or more other embodiments of the invention, one or more of the functions of the group manager (e.g., 110) may be performed by a data protection manager (not shown), a backup agent (e.g., 106), the individual production hosts (e.g., 102A-102N), a requesting target device (not shown), or other component of the system without departing from the invention.

Figure 1B:
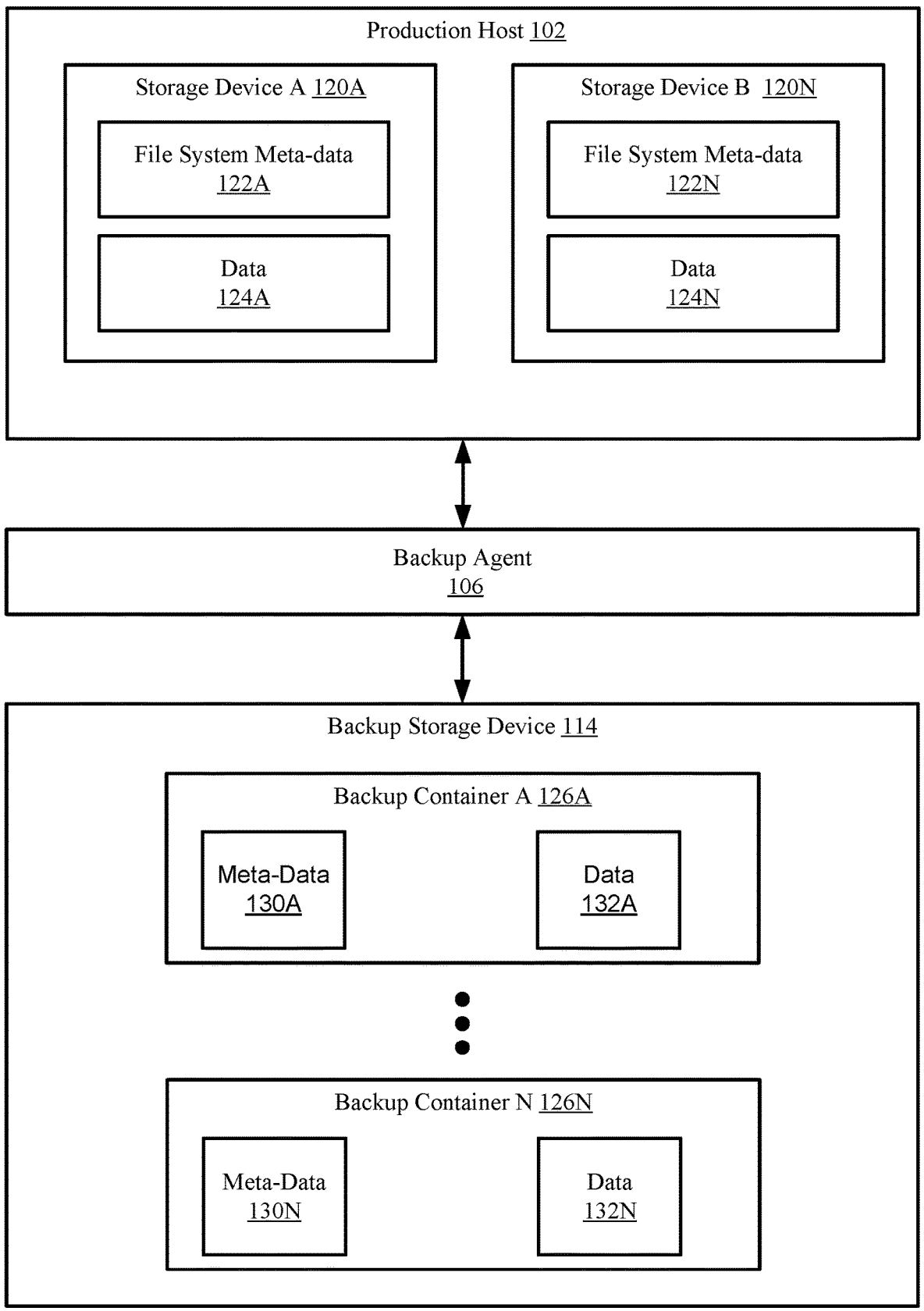
FIG. 1B shows a detailed diagram of a system for backing up and restoring a production host in accordance with one or more embodiments of the invention.

Turning now to FIG. 1B, FIG. 1B shows a diagram of specific components utilized in performing a backup of a user defined logical asset located on at least one production host (e.g., 102) and a backup agent (e.g., 106) in accordance with one or more embodiments of the invention. The production host (e.g., 102) communicates with one or more backup agents (e.g., 106) and related backup storage device (e.g., 114). Each component illustrated in FIG. 1B is discussed below.

The production host (e.g., 102) may be similar to the production hosts (e.g., 102A-102N) as discussed above in reference to FIG. 1A. The production host (e.g., 102) may include VMs, a hypervisor, a production agent, and local storage that includes a plurality of storage devices (e.g., 120A-120N). The production host may include additional, fewer, and/or different components without departing from scope of the invention. Each component may be operably connected to any of the other components via any combination of wired and/or wireless connections.

As discussed above, the production host may provide computer implemented services to clients as well as the backup agent(s) (e.g., 106). To provide and obtain the aforementioned computer implemented services, the production host may include application(s) which are stored on the local storage devices (e.g., 120A-102N). The production host may include other and/or additional components without departing from the invention.

The production host (e.g., 102) includes storage devices, (e.g., 120A and 120N). The storage devices include a file system meta-data repository (e.g., 122A-122N) and data (e.g., 124A-124N). A file system meta-data repository (e.g., 122A-122N) may be one or more data structures that includes information regarding application data stored in the file system repository. The information included in the file system meta-data repository (e.g., 122A-122N) in one or more embodiments of the invention may be determined as a normal function of the file system in each storage device (e.g., 120A-1204N). This information may also be determined as part of a meta-data-based backup (MBB), or other functions requested by the backup agent (e.g., 106), group manager (e.g., 110, FIG. 1A) or other components of the system.

The information included in the file system meta-data repository (e.g., 122A-122N) in one or more embodiments of the invention may be used for determining the files and folders that are associated with an asset, producing estimates of the size of files and folders associated with the asset and/or other functions such as performing a backup and restoration as will be described in more detail with regards to the methods shown in FIGS. 2 and 3. The file system meta-data repository (e.g., 122A-122N) may include additional information without departing from the invention.

The storage devices (e.g., 120A-120N), may include one or more data structures (e.g., 124A-124N) that may contain the actual data associated with one or more applications or assets. The storage devices (e.g., 120A-120N) may include data (e.g., 124A-124N) generated by the hosts (e.g., 102). The data may be any type of data such as, but not limited to, database data and email data generated by applications and/or their users. Each storage device (e.g., 120A-120N) may include any number of applications and associated data as well as assets not associated with a specific application such as user defined logical assets. In one or more embodiments of the invention the data (e.g., 124A-124N) is in the form of files and folders and each asset comprises of files and folders that are either related to a specific application or are related to a specific criteria defined by a user or administrator at the time that a backup is requested.

Users (e.g., individuals, administrators, or their proxies) operating or using the system may use the data (e.g., 124A-124N), stored on the storage devices (e.g., 120A-120N), when obtaining computer implemented services from the production host (e.g., 102). Additionally, the data (e.g., 124A-124N), stored on the storage devices (e.g., 120A-120N) of the production host (e.g., 102), may be obtained by a backup agent (e.g., 106) or other requesting device (not shown) to perform functions. The data (e.g., 124A-124N) of the storage devices (e.g., 120A-120N), may be used by other and/or additional entities for other and/or additional purposes without departing from the invention.

In one or more embodiments of the invention, the backup agent (e.g., 106) as described in more detail above with regards to FIG. 1A, receives a request for a backup and requests the asset from the production host (e.g., 102) or through an intermediary such as the group manager (e.g., 110, FIG. 1A). The backup agent (e.g., 106) is associated with backup storage (e.g., 114) for storing the backup data (e.g., 132A-132N) and associated meta-data for the backup (e.g., 130A-130N). In one or more embodiments of the invention, the backup storage (e.g., 114) stores the backup data (e.g., 132A-132N) in a plurality of containers (e.g., 126A-126N).

The backup agent (e.g., 106) may take the form of a physical device that may include circuitry. The physical device may be, for example, a field-programmable gate array, application specific integrated circuit, programmable processor, microcontroller, digital signal processor, or other hardware processor. The physical device may be adapted to provide the functionality of the backup agent (e.g., 106) as described throughout this application. In one or more embodiments of the invention, the backup agent (e.g., 106) is implemented as computer instructions, e.g., computer code, stored on a persistent storage that when executed by a client or user, causes a processor to provide the functionality of a backup agent (e.g., 106).

In one or more embodiments of the invention, the backup agent (e.g., 106) or other equivalent components of the system such as a group manager (e.g., 110, FIG. 1A) determines how to slice an asset that is requested by the backup request. As will be described in more detail below with regards to the method of FIG. 2, when a backup is requested for an asset located on a host (e.g., 102) on one or more of its storage devices (e.g., 120A-120N), the backup agent (106) utilizes the file-system meta-data (e.g., 122A-122N) located on each of the hosts (e.g., 102A-102N, FIG. 1A) to determine where the asset is located and how large the asset is.

At the same time, the backup agent (e.g., 106) reads slicing parameters such as the command to perform the backup from a configuration file or other source. The configuration file may be stored on storage associated with the group manager (e.g., 110), in the local storage (e.g., 112) of one or more of the production hosts (e.g., 102A-102N), or it may be provided by the requesting target device (e.g., 106) when it requests the asset. The slicing parameters may include such information as a predetermined tolerance for differences in the size of the slices, instructions for trimming the meta-data/files associated with the asset, such as but not limited to, eliminating files that are not necessary for utilizing the asset (for example "readme files"). The slicing parameters, in accordance with one or more embodiments of the invention may also include a predetermined number of slices to use and a maximum size for each individual slice. Other information may be included in the slicing parameters without departing from the invention.

Based on the meta-data for the asset and slicing parameters, the backup agent (e.g., 106) may then assign files or portions of files, to individual slices. The backup agent (e.g., 106) assigns the files, folders, or portions thereof to the slices based on the criteria in the slicing parameters. In one or more embodiments of the invention, the files may be assigned in such a way that each slice has an equal size within a predetermined tolerance. This tolerance may be plus or minus a percentage that is specified in the slicing parameters and/or specified by a client, a user, or an administrator at the time that the asset is requested. Some examples of a tolerance are $\leq \pm 1\%$, $\pm 5\%$, or $\pm 10\%$. Other percentages and/or ranges may be used without departing from the invention. In one or more other embodiments of the invention, the files and folders are assigned without considering the individual slice size, rather the total cost (the total number times each file comprising the slice has to be open, read, and closed) of assembling the slice is used to determine which files and folders to assign to an individual slice. This results in slices that may differ in size but require similar amounts of computational activity by the backup agent (e.g., 106) and/or production host (e.g., 102). Other criteria may be used to determine the number and configuration of the files and/or folders added to each slice without departing from the invention.

Once the files, folders, or portion of them are assigned to the slices, the backup agent (e.g., 106) may save the meta-data for the files with an indication of which slice they are to be applied to or in the final backup meta-data (e.g., 130A-130N). Other locations, such as the local storage (e.g., 112A-112N, FIG. 1A) of the production hosts (e.g., 102A-102N, FIG. 1A), may be used without departing from the invention. The backup agent (e.g., 106), utilizing network telemetry and the file system meta-data (e.g., 122A-122N), may then assign the slices to individual network streams. Each of the network streams has a cost (which is calculated by counting the number times each file or folder comprising the stream/slice is opened, read, and closed) and throughput, which as described above, is determined from the network (e.g., 108, FIG. 1A) that is equivalent within a predetermined threshold that is ≤±1%, ±5%, or ±10% of each other. Other percentages and/or ranges may be used without departing from the invention.

In accordance with one or more embodiments of the invention, the backup agent (e.g., 106) assigns each file and/or folder to a specific slice and stream not based on the order that the files and/or folders are found in the file system and/or file system meta-data (e.g., 122A-122N). But rather, each file is assigned in the order that produces slices and steams that have cost and throughput that are similar to each other within the predetermined threshold. Once the files and folders associated with an asset are sliced, and placed in streams of equivalent cost and threshold, the backup agent (e.g., 106) causes the streams to be transmitted by the network (e.g., 108, FIG. 1A) to the backup storage device (e.g., 114).

In one or more embodiments of the invention, the backup storage device (e.g., 114) stores each stream in its own backup container (e.g., 126A-126N) without putting the streams, slices, files, and/or folders, back into the original order or associations found in the file systems on the production host (e.g., 102). In one or more embodiments of the invention, each container has its own meta-data (e.g., 130A-130N) that maintains the mapping between the data (e.g., 132A-132N) located in a stream stored in a container (e.g., 126A-126N) and its original location on the storage devices (e.g., 120A-120N). In one or more embodiments of the invention, alternatively, a single meta-data (e.g., 130A) may be used to store the mapping between all the data (e.g., 132A-132N) generated in the backup in stored in multiple containers (e.g., 126A-126N).

In accordance with one or more embodiments of the invention, when a restoration is requested at a later time, as is described in more detail below with regards to the method shown in FIG. 3, the backup agent (e.g., 106) retrieves the meta-data (e.g., 130A-130N) and data (e.g., 132A-132N) stored in the containers (e.g., 126A-126N) on the backup storage device (e.g., 114). Without reorganizing the data on the backup storage device (e.g., 114), the backup agent (106) restores the files and folders of the asset to their original file system on the storage devices (e.g., 120A-120N) of the production host (e.g., 102). The file and folders, in accordance with one or more embodiments of the invention, may alternatively be restored to a new or alternative location on the production hosts (e.g., 102), including on a new production host, or even a new group (e.g., 100, FIG. 1A).

The backup storage device (e.g., 114) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data. The backup storage devices may utilize any quantity of hardware storage resources of any number of computing devices for storing data. For example, the backup storage device (e.g., 114) may utilize portions of any combination of hard disk drives, solid state disk drives, tape drives, and/or any other physical storage medium of any number of computing devices. The backup storage device (e.g., 114) may additional be part of the storage devices (e.g., 120A-120N) located on the production host (e.g., 102).

Figure 2:
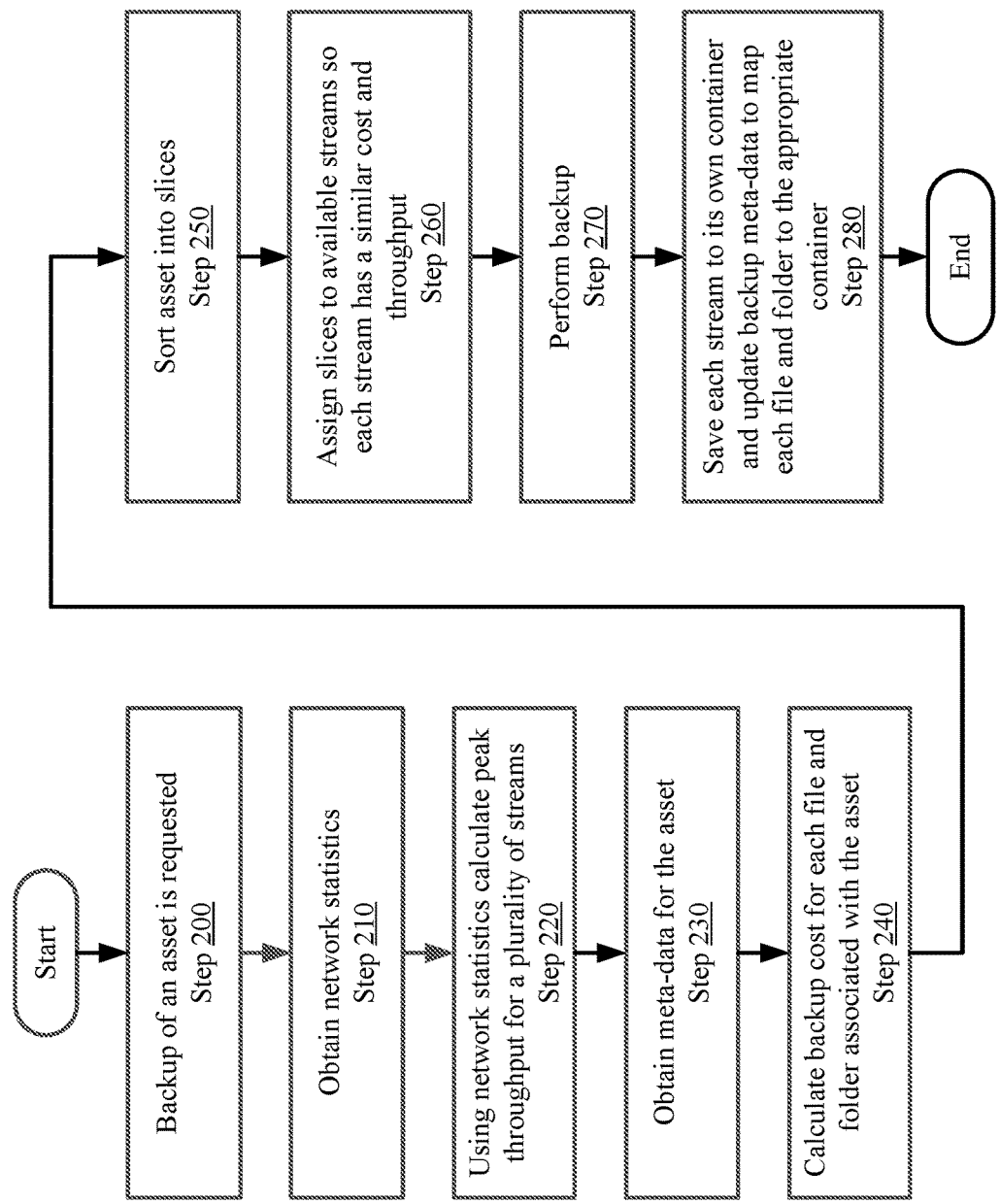
FIG. 2 shows a flowchart of a method of backing up an asset in accordance with one or more embodiments of the invention.

FIG. 2 shows a method of backing up an asset located on one or more production hosts (e.g., 102A-102C, FIG. 1A) in accordance with one or more embodiments of the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

The method of FIG. 2 may be performed by, for example, a backup agent (e.g., 106, FIG. 1B), a group manager (e.g., 110, FIG. 1A), or an individual production host (e.g., 102A-102N, FIG. 1A). Other components of the system illustrated in FIGS. 1A and 1B may perform all or a portion of the method of FIG. 2 without departing from the invention.

In step 200, the system receives a request for a backup of an asset. The request may come from a user, an administrator, or an application of either the production hosts (e.g., 102A-102N, FIG. 1A) or a backup agent (e.g., 106). The request may include instructions for how to perform the backup (such as, but not limited to, how many streams to use, tolerance for differences between each stream in cost and throughput, etc.) The request may also include an indication of a location to store the backup, which may include the backup storage device (e.g., 114, FIG. 1B) or other locations.

The asset may be a file, a plurality of files, as well as folders or other resources that are in general associated with the asset requested by the backup agent (e.g., 106, FIG. 1A). When the request for an asset is received, the group manager (e.g., 110, FIG. 1A) or an appropriate production host (e.g., 102A-102N, FIG. 1A) determines the location of the asset utilizing file system meta-data (e.g., 122A-122N) and prepares the asset to be sent to the backup storage device (e.g., 114, FIG. 1B) or another location.

Once the request for the backup of the asset is receive the method proceeds to step 210, where network statistics are obtained. In one or more embodiment of the invention, the backup agent (e.g., 106, FIG. 1A) requests or determines statistics by obtaining telemetry form the network (e.g., 108). Alternatively, the backup agent (e.g., 106, FIG. 1A) itself, or in concert with one or more production hosts (e.g., 102A-102N, FIG. 1A) may determine network statistics by sending test packets or by other known or later discovered methods for determining network statistics.

Once the network statistics are obtained in step 210 the method proceeds to step 220 where the network statistics are used to calculate peak throughput for a plurality of streams. The number of streams may be determined based on instructions included in the backup request or may be based on the maximum number of streams the production host (e.g., 102, FIG. 1B), backup agent (e.g., 106, FIG. 1B) or network (e.g., 108), FIG. 1A) is able to support. Based on metrics such as available bandwidth, number of streams, and network speed, the throughput for each of the streams may be determined. Alternatively, the number of streams may be determined based on the maximum throughput, by determining the number of streams that would still receive a pre-determined level of service given the current network statistics.

Once the backup agent (e.g., 106, FIG. 1B) determines the peak throughput as well as the number of streams in step 220, the method proceeds to step 230. In step 230, file-system meta-data associated with the asset is retrieved. The backup agent (e.g., 106, FIG. 1A) or group manager (e.g., 110, FIG. 1A) or related component of the group (e.g., 100, FIG. 1A) which received the request in step 200, may request meta-data from the file-system meta-data (e.g., 122A-122N, FIG. 1B) stored on the local storage (e.g., 112, FIG. 1A). Alternatively, the meta-data may already be stored in a common file-system meta-data file in, e.g., the group manager (e.g., 110, FIG. 1B). The file-system meta-data may be obtained during a meta-data-based backup (MBB).

Using the meta-data obtained in step 230, the backup agent (e.g., 106, FIG. 1B) or other component of the systems of FIGS. 1A and 1B, may calculate a backup cost for each file and folder that is associated with an asset. In a non-limiting example, a normal file would have a cost of three (one open, one read, and one close). However, in another non-limiting example, a file that is compressed might require multiple openings and readings in order to decompress the file, and then read the decompressed file for use in the resulting backup (one open, one read, one decompress, one write, one close, another open, another read, and another close, for a total cost of eight). Other characteristics of files and folders related to the asset may result in different costs for each file and folder. The invention is not limited to the above examples of calculating a cost.

Once the cost is calculated in step 240, the method proceeds to step 250. In step 250, the files and folders comprising the asset are sorted into slices. This may be performed by the backup agent (e.g., 106, FIG. 1A), the group manager (e.g., 110, FIG. 1A) or related component of the group (e.g., 100, FIG. 1A). The backup agent (e.g., 106, FIG. 1A), or related component, uses slicing parameters, which may include such information as a predetermined tolerance for differences in the slice size, and instructions for trimming the meta-data/files associated with the asset (such as, but not limited to, eliminating files that are not necessary for utilizing the asset, for example readme files). The slicing parameters, in accordance with one or more embodiments of the invention, may also include a predetermined number of slices to use and maximum size for each individual slice. Other information may be included in the slicing parameters without departing from the invention.

Based on the slicing meta-data for the asset and slicing parameters the backup agent, determines the size and number of slices needed form sending the asset to the backup storage (e.g., 114, FIG. 1B). The size and number of slices may be predetermined and form a part of the slicing parameters. In one or more embodiments of the invention, a pre-determined number of slices may be specified, and based on this number and the total size of the asset, the average size of the slices may be determined. For example, in a non-limiting example, if five slices are allowed, and the asset is fifty megabytes in total size, then each slice would have an average size of ten megabytes. Alternatively, the number of slices may be set based on network conditions, capacity of individual network streams as will be described below. In one or more embodiments of the invention, the size of the slices is predetermined based on the capabilities of the network (e.g., 108, FIG. 1A) or based on other criteria. Based on the size of the slices, then the total number of slices needed to transport a particular asset may be determined. Other methods of determining the size and number of slices needed to transport an asset may be used, without departing from the invention.

Based on the determination of the number of slices and the determination of the size of each individual folder or file associated with the asset, the files, and folders (or other data) associated with the asset are assigned to individual slices. The files are assigned in such a way that each slice has an equal size within a predetermined tolerance. This tolerance may be plus or minus a percentage that is specified in the slicing parameters and/or specified by a client, a user, or administrator at the time the asset is requested. Some examples of a tolerance are ≤±1%, ±5%, or ±10%, other percentages and/or ranges may be used without departing from the invention.

Once the files and folders forming the asset are assigned to slices in step 250, the slices are then assigned to one more available streams in step 260. In step 260, the slices are assigned to the available streams in such a way that each stream has a similar cost and throughput. The backup agent (e.g., 106), utilizing the peak throughput, and number of streams determined in step 220 then assigns the slices produced in step 250 to individual network streams, in such a way that each of the network streams has a cost and throughput which as described above is determined from the network (e.g., 108, FIG. 1A) that is equivalent within a predetermined threshold that is ≤±1%, ±5%, or ±10% of each other. Other percentages and/or ranges may be used without departing from the invention.

In accordance with one or more embodiments of the invention, the backup agent (e.g., 106) assigns each file and/or folder to a specific slice and stream, not based on the order that the files and/or folders are found in the file system and/or file system meta-data (e.g., 122A-122N), but rather in the order that produces slices and steams that have a cost and throughput that are similar to each other within the predetermined threshold. Because each slice may have a different cost based on the files and/or folders associated with the slice, using the slice cost (which is determined by aggregating the cost per file and/or folder in the slice) allows each stream to incur the same or substantially similar costs. Said another way, each stream will do approximately the same amount of "work." As a result, some streams may transmit a greater number of lower cost slices while other streams may transmit a lesser number of higher cost slices. This may result in certain streams transmitting more data than other streams, even though the cost incurred by each stream is substantially the same (i.e., within the pre-determined threshold).

Continuing with the discussion of FIG. 2, once the files and folders associated with an asset are sliced and placed in streams such that the resulting allocation of slices to streams results in the streams having at cost and throughput within the pre-determined threshold, the method proceeds to step 270.

In step 270, the backup is performed. The backup agent (e.g., 106) causes the streams to be transmitted by the network (e.g., 108, FIG. 1A) to the backup storage device (e.g., 114). In one or more embodiments of the invention, the backup storage device (e.g., 114) stores each stream in step 280 in its own backup container (e.g., 126A-126N) without putting the streams, slices, files, and/or folders, back into the original order or associations as found in the file systems on the production host (e.g., 102). In one or more embodiments of the invention, each container has its own meta-data (e.g., 130A-130N) that maintains a mapping between the data (e.g., 132A-132N) transmitted by the stream stored in the corresponding container of the stream (e.g., 126A-126N) and its original location on the storage devices (e.g., 120A-120N). In one or more embodiments of the invention, alternatively, a single meta-data (e.g., 130A) may be used to store the mapping between all of the data (e.g., 132A-132N) generated in the backup in stored in multiple containers (e.g., 126A-126N).

The method may end following step 280.

Figure 3:
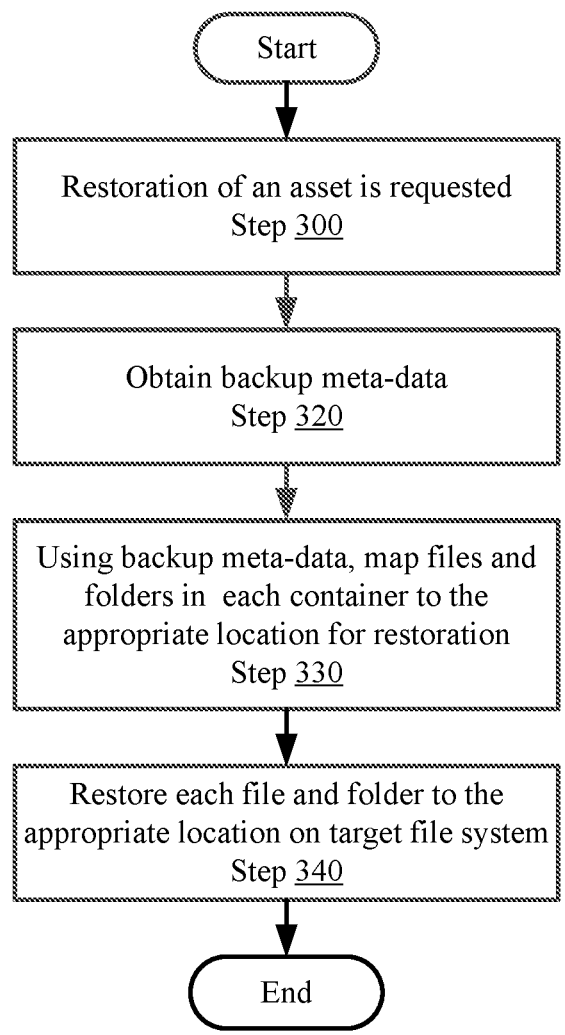
FIG. 3 shows a flowchart of a method of restoring an asset in accordance with one or more embodiments of the invention.

FIG. 3 shows a method of restoring an asset in accordance with one or more embodiments of the invention. While the various steps in the method are presented and described sequentially, those skilled in the art will appreciate that some or all the steps may be combined, omitted, executed in different orders, or some or all steps may be executed in a parallel manner without departing from the scope of the invention.

The method of FIG. 3 may be performed by, for example, a backup agent (e.g., 106, FIG. 1B), a group manager (e.g., 110, FIG. 1A), or an individual production host (e.g., 102A-102N, FIG. 1A). Other components of the system illustrated in FIGS. 1A and 1B may perform all, or a portion of the method of FIG. 3 without departing from the invention.

In step 300, the system receives a request to restore an asset. In one or more embodiments of the invention, the asset is stored in backup storage (e.g., 114, FIG. 1B) and was produced by the method describe above with regards to FIG. 2. Alternatively, in one or more embodiments of the invention, the asset may be stored in a backup produced by other methods then those described in FIG. 2.

The request for the restoration may come from a user, an administrator, or from any other source. The request may include instructions on where to restore the backup, including the original production host (e.g., 102, FIG. 1B) or a new production host. The request may be for the restoration of an entire backup, or for a single asset or file located in the backup. The asset may be a file, a plurality of files, as well as folders or other resources that are in general associated with the asset requested to be restored. When the request for an asset to be restored is received, the backup agent (e.g., 106, FIG. 1A) or equivalent component such as a group manager (e.g., 110, FIG. 1A) or an appropriate production host (e.g., 102A-102N, FIG. 1A) prepares to determine the location of the backup and prepares the appropriate file system and/or storage device (e.g., 120A-102N, FIG. 1B) for restoring the asset.

Once the request for restoring the asset is received in step 300, the method proceeds to step 320, wherein the backup meta-data (e.g., 130A-130N) is obtained by the backup agent (e.g., 106, FIG. 1B) or related component. The backup meta-data (e.g., 130A-130N) is then used in step 230, to map each file and folder stored in the backup to appropriate location for restoration. During this time, the files and folders are not moved, and not placed in a new order. The meta-data is read and the mapping between the file and/or folder's original location on the file system of the production host (e.g., 102, FIG. 1B) is used to determine where on a target file system (which, in one or more embodiments of the invention, may be its original location, or a new location on a different production host and/or file system). Once the meta-data in step 330 is used to determine where to restore the files and folders, in step 340 the files and folders are restored to the appropriate location on the target file-system.

The method may end following step 340.

Additionally, as discussed above, embodiments of the invention may be implemented using computing devices. FIG. 4 shows a diagram of a computing device in accordance with one or more embodiments of the invention. The computing device (400) may include one or more computer processors (410), non-persistent storage (430) (e.g., volatile memory, such as random access memory (RAM), cache memory), persistent storage (440) (e.g., a hard disk, an optical drive such as a compact disk (CD) drive or digital versatile disk (DVD) drive, a flash memory, etc.), a communication interface (420) (e.g., Bluetooth interface, infrared interface, network interface, optical interface, etc.), input devices (460), output devices (450), and numerous other elements (not shown) and functionalities. Each of these components is described below.

In one embodiment of the invention, the computer processor(s) (410) may be an integrated circuit for processing instructions. For example, the computer processor(s) may be one or more cores or micro-cores of a processor. The computing device (400) may also include one or more input devices (460), such as a touchscreen, keyboard, mouse, microphone, touchpad, electronic pen, or any other type of input device. Further, the communication interface (420) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (450), such as a screen (e.g., a liquid crystal display (LCD), a plasma display, touchscreen, cathode ray tube (CRT), monitor, projector, or other display device), a printer, external storage, or any other output device. One or more of the output devices may be the same or different from the input device(s). The input and output device(s) may be locally or remotely connected to the computer processor(s) (410), non-persistent storage (430), and persistent storage (440). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments of the invention described above may improve the operation of one or more computing devices. In one or more embodiments, assets such as files and folders that are to be backed up are placed in appropriate network slice queues which are then assigned to network streams. The slices/assets are assigned in such a way that each stream has a similar cost and throughput (within a predetermined tolerance). The backup is performed, and the streams are stored in their own backup containers until a restoration is needed. Once a restoration is needed, the meta-data for the backup is used to restore the files and folders, forming the asset back to their appropriate locations in the target file-system.

The one or more embodiments of the invention utilize meta-data to ensure that a backup is efficiently transmitted, stored, and restored. This results in an efficient use of network resources, while minimizing the amount of work the hosts and/or clients must perform in order to perform a backup and/or restoration of an asset.

The problems discussed above should be understood as being examples of problems solved by embodiments of the invention disclosed herein and the invention should not be limited to solving the same/similar problems. The disclosed invention is applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for performing a backup, the method comprising:
   receiving a request for a backup of an asset associated with a production host, wherein the asset comprises files and folders stored in a file-system of the production host;
   in response to the request, retrieving network statistics for a plurality of streams;
   determining, based on the network statistics, peak throughput for the plurality of streams;
   retrieving meta-data for the asset;
   slicing, using the meta-data for the asset, the asset into a plurality of slices;
   assigning each of the plurality of slices to one of the plurality of streams in such a way that each stream of the plurality of streams has a similar throughput based on the peak throughput for each of the plurality of streams;
   after the assigning:
      initiating the backup using the plurality of streams;
      storing data transferred in each stream of the plurality of streams to its own backup container, wherein the data comprises files and folder in each slices of the asset assigned to each stream of the plurality of streams;
      generating mapping, wherein the mapping maps each file and folder in each slice of the asset stored in the backup container to its original location in the file-system of the production host; and
      storing the mapping in meta-data associated with the backup.

2. The method of claim 1, the method further comprising:
   after storing the mapping, receiving a request to restore the asset;
   retrieving, in response to receiving the request, the meta-data associated with the backup;
   determining, using the mapping, which container includes each file and folder forming the asset; and
   restoring, using the mapping, each file and folder forming the asset to its original location in the file-system of a target production host.

3. The method of claim 2, wherein during restoring, the slices are not moved to a different backup container.

4. The method of claim 1, wherein the files and folders comprising the asset are not backed up in order.

5. The method of claim 1, wherein when the slices are assigned to one of the plurality of streams in such a way that each stream of the plurality of streams has the similar throughput, the slices are assigned such that each stream of the plurality of streams has a total throughput that is within a predetermined percentage of the total throughput of each of the other streams of the plurality of streams.

6. The method of claim 5, wherein each stream of the plurality of streams also has a similar total cost that is calculated for each slice, wherein the cost is calculated based on the number of times that each file and folder that comprises each slice must be open, read, and closed when the backup is performed.

7. The method of claim 6, wherein each stream of the plurality of streams has a total cost that is within a predetermined percentage of the total cost of each of the other streams of the plurality of streams.

8. A non-transitory computer readable medium comprising computer readable program code, which when executed by a computer processor, enables the computer processor to perform a method for performing a backup, the method comprising:
   receiving a request for a backup of an asset associated with a production host, wherein the asset comprises files and folders stored in a file-system of the production host;
   in response to the request, retrieving network statistics for a plurality of streams;
   determining, based on the network statistics, peak throughput for the plurality of streams;
   retrieving meta-data for the asset;
   slicing, using the meta-data for the asset, the asset into a plurality of slices;
   assigning each of the plurality of slices to one of the plurality of streams in such a way that each stream of the plurality of streams has a similar throughput based on the peak throughput for each of the plurality of streams;
   after the assigning:
      initiating the backup using the plurality of streams;
      storing data transferred in each stream of the plurality of streams to its own backup container, wherein the data comprises files and folder in each slices of the asset assigned to each stream of the plurality of streams;
      generating mapping, wherein the mapping maps each file and folder in each slice of the asset stored in the backup container to its original location in the file-system of the production host; and
      storing the mapping in meta-data associated with the backup.

9. The non-transitory computer readable medium of claim 8, wherein the method further comprises:
   after storing the mapping, receiving a request to restore the asset;
   retrieving, in response to receiving the request, the meta-data associated with the backup;
   determining, using the mapping, which container includes each file and folder forming the asset; and
   restoring, using the mapping, each file and folder forming the asset to its original location in the file-system of a target production host.

10. The non-transitory computer readable medium of claim 9, wherein during restoring, the slices are not moved to a different backup container.

11. The non-transitory computer readable medium of claim 8, wherein the files and folders comprising the asset are not backed up in order.

12. The non-transitory computer readable medium of claim 8, wherein when the slices are assigned to one of the plurality of streams in such a way that each stream of the plurality of streams has the similar throughput, the slices are assigned such that each stream of the plurality of streams has a total throughput that is within a predetermined percentage of the total throughput of each of the other streams of the plurality of streams.

13. The non-transitory computer readable medium of claim 12, wherein each stream of the plurality of streams also has a similar total cost that is calculated for each slice, wherein the cost is calculated based on the number of times that each file and folder that comprises each slice must be open, read, and closed when the backup is performed.

14. The non-transitory computer readable medium of claim 13, wherein each stream of the plurality of streams has a total cost that is within a predetermined percentage of the total cost of each of the other streams of the plurality of streams.

15. A system comprising:
a production host which comprises of:
   a processor; and
   a memory comprising instructions, which when executed by the processor, perform a method for performing a backup comprising:
      receiving a request for a backup of an asset associated with a production host, wherein the asset comprises files and folders stored in a file-system of the production host;
      in response to the request, retrieving network statistics for a plurality of streams;
      determining, based on the network statistics, peak throughput for the plurality of streams;
      retrieving meta-data for the asset;
      slicing, using the meta-data for the asset, the asset into a plurality of slices;
      assigning each of the plurality of slices to one of the plurality of streams in such a way that each stream of the plurality of streams has a similar throughput based on the peak throughput for each of the plurality of streams;
      after the assigning:
         initiating the backup using the plurality of streams;
         storing data transferred in each stream of the plurality of streams to its own backup container, wherein the data comprises files and folder in each slices of the asset assigned to each stream of the plurality of streams;
      generating mapping, wherein the mapping maps each file and folder in each slice of the asset stored in the backup container to its original location in the file-system of the production host; and
      storing the mapping in meta-data associated with the backup.

16. The system of claim 15, wherein the method further comprises:
   after storing the mapping, receiving a request to restore the asset;
   retrieving, in response to receiving the request, the meta-data associated with the backup;
   determining, using the mapping, which container includes each file and folder forming the asset; and
   restoring, using the mapping, each file and folder forming the asset to its original location in the file-system of a target production host.

17. The system of claim 16, wherein during restoring, the slices are not moved to a different backup container.

18. The system of claim 15, wherein the files and folders comprising the asset are not backed up in order.

19. The system of claim 15, wherein when the slices are assigned to one of the plurality of streams in such a way that each stream of the plurality of streams has the similar throughput, the slices are assigned such that each stream of the plurality of streams has a total throughput that is within a predetermined percentage of the total throughput of each of the other streams of the plurality of streams.

20. The system of claim 19, wherein each stream of the plurality of streams also has a similar total cost that is calculated for each slice, wherein the cost is calculated based on the number of times that each file and folder that comprises each slice must be open, read, and closed when the backup is performed.

* * * * *